United States Patent Office

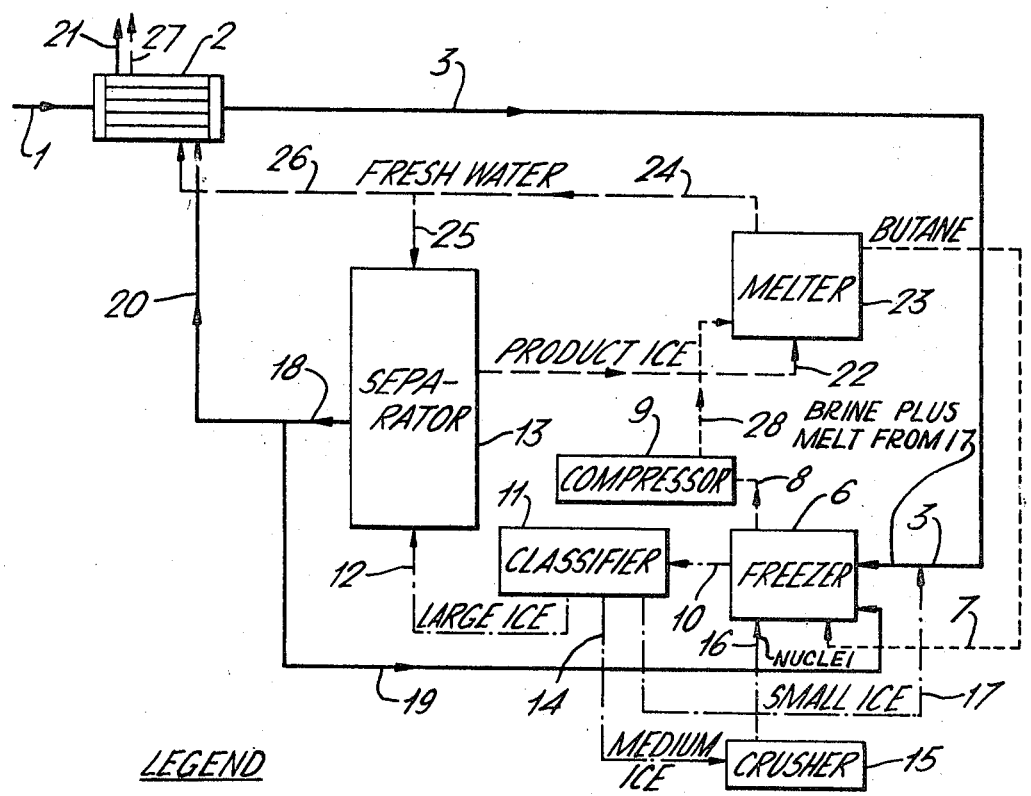

3,525,230
Patented Aug. 25, 1970

3,525,230
SIZED CRYSTAL CLASSIFICATION
Michael John Stapley Smith, Abingdon, England, assignor to United Kingdom Atomic Energy Authority, London, England
Filed Jan. 4, 1967, Ser. No. 607,320
Claims priority, application Great Britain, Jan. 7, 1966, 760/66
Int. Cl. B01d 9/04
U.S. Cl. 62—58       8 Claims

ABSTRACT OF THE DISCLOSURE

A method of and apparatus for freezing in which a slurry of ice crystals from a freezer is passed to a classifier and separated into three fractions. The largest sized fraction is taken as product ice; the middle sized fraction is used, preferably after crushing, as seed crystals; and the smallest sized fraction is melted. The invention is applicable, but not exclusively, to desalination.

BACKGROUND OF THE INVENTION

The present invention relates to the freezing of aqueous systems by cooling to a sufficiently low temperature that solid particles of "ice" are formed. Such a technique is usable in the case of brine systems to provide ice which is essentially free of salt, thereby to effect desalination and produce, for example, potable water. The technique is also usable to remove water from the aqueous system, e.g. in the production of concentrated fruit juices.

Since the techniques of freezing are broadly applicable to either such use, the invention will henceforth be described only in relation to the freezing of "brine" and it follows that, where applicable, the term "brine" should also be understood to include fruit and vegetable juices, beverages and other similar aqueous systems.

It should also be explained that the ice formed in the process of this invention may be true ice or may be a hydrate, for example formed between the water and the refrigerant fluid.

One convenient way of forming the ice is to pass liquid refrigerant such as, for example, butane into a stirred tank of brine and allow the refrigerant to vapourise by extracting the vapour from above the surface of the brine. The latent heat of vapourisation of the refrigerant will be withdrawn from the brine which will thereby be cooled to form ice particles. Depending upon the nature of the refrigerant and the conditions of temperature and pressure, a true ice will be formed or a solid hydrate with the refrigerant. Thus, if liquid propane is used as the refrigerant, the hydrate is liable to be formed as it is stable in pure water at pressures above 65 p.s.i.g. at a temperature of 42° F.

It is well known that the ice particles that form in such a freezing process are essentially free from brine and therefore the problem is to remove these ice particles from the freezer, remove any adhering brine and melt them to provide product fresh water of a quality suitable for drinking or agricultural purposes. However, unfortunately the adhering layer of brine tends to be very tenacious and the problems encountered in its removal are extremely severe. It should be noted, for example, that simple draining will remove essentially no brine as the surface tension effects could be sufficient to maintain a column of brine some 70 cms. high.

It will be known that ice crystals are generally hexagonal in form, and can be made to grow as flat plates. I have found that in the separation of such ice crystals from adhering brine, better results are obtained if ice crystals of more nearly equi-axial form can be employed. That is to say, there is an economic advantage in obtaining larger and better shaped ice crystals.

It is also known that it is generally easier to remove adherent brine from large crystals of ice rather than from small crystals and it has heretofore been common practice to remove the larger crystals from the freezer as the product and to recycle the smaller crystals. In one arrangement (see for example U.S. Pat. 3,148,143 to Donath) the recycled crystals are passed through a relatively hot zone in which most of them are melted.

It is an object of the present invention to provide a method of freezing designed to produce better shaped crystals.

SUMMARY OF THE INVENTION

According to the present invention, there is provided a method of freezing brine comprising continuously effecting cooling of a mass of brine in a freezer, removing from this mass a slurry of ice crystals in brine and passing the same to a classifier to separate the ice content into three fractions, passing the largest sized fraction to an ice-water separator, recycling the middle sized fraction to the freezer without substantial melting and recycling the smallest sized fraction to the freezer after melting the same.

It will be seen that in essentials the present invention withdraws the largest crystals from the freezer for passing to the separator and destroys the smallest crystals so as to reduce the number of nuclei available in the freezing brine in order to promote growth of the existing crystals in the brine. Very conveniently, the recycled crystals may be crushed. This has the effect that as the crystals are plate-shaped, the thickness is not essentially reduced by the crushing operation, and in consequence, although preferred growth will result in plate-shaped crystals being again obtained, those crystals which have grown upon crushed crystals that have been recycled will in general be thicker. Thus the recycling and crushing operation will tend to promote the growth of more nearly equi-axial crystals.

Although the freezing is preferably effected by the introduction of a refrigerant liquid as above described, it may also be effected, in known manner, by a vacuum pump system.

The melting of the smallest crystals is conveniently effected by passing them into the fresh brine intake to the freezer so that the latent heat of melting of the crystals is withdrawn from the inflowing brine.

Any suitable form of classifier may be employed, but we prefer to use the type known as a sieve bend.

BRIEF DESCRIPTION OF THE DRAWING

In order that the present invention may be more readily understood, one embodiment of the same will now be described by way of example and with reference to the accompanying drawing which is a diagrammatic flow sheet.

DESCRIPTION OF THE PREFERRED EMBODIMENT

Referring now to the drawing, fresh brine at a temperature of approximately 70° F. is supplied through a pipe 1 to a heat exchanger 2 and passes thence by a pipe 3 to a freezer 6. Freezing is effected in the freezer 6 by passing into it a stream of liquid butane through a pipe 7 and withdrawing gaseous butane through a pipe 8 by means of a compressor 9.

The degree of freezing is controlled so as to give plate-type crystals in a slurry containing approximately 15–20% of ice, and this slurry is withdrawn from the freezer by a pipe 10 and passed to a classifier 11 which splits the ice content into three fractions. The larger sized fraction is passed from the classifier 11 by a pipe 12 to the base of an ice-water separator 13 which is conveniently of the form described in our said copending application. The middle sized fraction is withdrawn from the classifier 11 through a pipe 14, passed through a crusher 15 and recycled to the freezer 6 through a pipe 16 to act as nuclei. The smallest sized fraction is withdrawn from the classifier 11 through a pipe 17 and passed into the pipe 3 whereby these small ice crystals are melted before they actually enter the freezer 6, and at the same time serve to cool the inflowing brine.

In the separator 13 brine is withdrawn through a pipe 18 and a portion is recirculated through a pipe 19 to the freezer 6 with, if desired, a fraction being recycled direct to either the pipe 10 or the pipe 12.

A further proportion of the brine flowing in the pipe 18 is rejected to waste through the pipe 20 and passes through the heat exchanger 2 and thence to pipe 21.

Product ice from the separator 13 is passed by a pipe 22 to a melter 23 and fresh water leaves this melter through a pipe 24, a portion of the fresh water being recycled through a pipe 25 as wash water for the separator 13 and the remainder passing by a pipe 26 to the heat exchanger 2 and thence to a product off-take pipe 27. The hot liquid butane from the compressor 9 passes by a pipe 28 to the melter 23 to be cooled therein and from the melter passes by the pipe 7 to the freezer 6.

The design of freezer is in general that adopted in the art, but it will in general be of slightly greater capacity as not all the output of the freezer is accepted for passing to the separator 13. It has been calculated that if the ice particle size fed to the separator 13 is doubled, then the specific flow rate through this separator may be increased by a factor of 3 and the cross-sectional area cut by a similar factor. In some applications, an increase in particle size will result in a decrease in the number of risers required. It should however be emphasized that the overall result is that the separator 13 if of approximately the same volume but of a greatly reduced diameter as compared with a separator designed for small ice particles.

I claim:
1. A method of freezing comprising continuously effecting cooling of a mass of aqueous liquid in a freezer, removing from this mass a slurry of ice crystals in the aqueous liquid, passing such slurry to a classifier to separate the ice content into three separate fractions by size including a large sized fraction, a medium sized fraction and a small sized fraction, passing the large sized fraction to an ice-water separator, recycling the middle sized fraction to the freezer without substantial melting to act as nuclei for promoting formation of further ice crystals, melting the small sized fraction so that the said crystals of the smallest sized fraction are not available as nuclei, and then passing said small sized fraction back to the freezer.

2. The method of claim 1, including the step of crushing the middle sized fraction prior to recycling to the freezer.

3. The method of claim 1, wherein the cooling of the aqueous liquid in the freezer is effected by passing through it a vapourisable refrigerant liquid into direct contact therewith.

4. The method of claim 3, wherein the refrigerant liquid is butane.

5. The method of claim 3, wherein the refrigerant liquid is propane and the temperature and pressure are such that the ice is a hydrate.

6. Desalination apparatus comprising a freezer having an aqueous liquid inlet and an ice slurry outlet, a classifier means for separating the ice content of the slurry into three separate fractions by size including a large sized fraction, a medium sized fraction and a small sized fraction, means to pass the slurry from said outlet to said classifier, an ice-water separator, means to pass the largest sized fraction of ice crystals from said classifier to said separator, means to recycle the middle sized fraction of ice crystals to the freezer for further growth therein of ice crystals, and further means to recycle the smallest sized fraction of ice crystals to said liquid inlet, said further means including melting means for melting these small crystals prior to entering the freezer.

7. The apparatus of claim 6, including a crusher to crush the middle sized fraction prior to reintroduction into the freezer.

8. The apparatus of claim 6, wherein the classifier is a sieve bend.

References Cited
UNITED STATES PATENTS

| | | | |
|---|---|---|---|
| 2,735,779 | 2/1956 | Wenzelberger | 62—58 |
| 2,896,419 | 7/1959 | Thompson | 62—58 |
| 3,069,864 | 12/1962 | Crosby | 62—58 |
| 3,217,505 | 11/1965 | Tuwiner | 62—58 |
| 3,285,022 | 11/1966 | Pike | 62—58 |

NORMAN YUDKOFF, Primary Examiner

U.S. Cl. X.R.

62—124